(12) United States Patent
Pydin (10) Patent No.: US 11,905,066 B2
(45) Date of Patent: Feb. 20, 2024

(54) PALLET STRUCTURE FOR AUTONOMOUS WORK VEHICLE

(71) Applicant: Honda Motor Co., Ltd., Tokyo (JP)

(72) Inventor: Andrii Pydin, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 17/563,006

(22) Filed: Dec. 27, 2021

(65) Prior Publication Data

US 2023/0202710 A1 Jun. 29, 2023

(51) Int. Cl.
*B65D 19/00* (2006.01)
*B60P 7/10* (2006.01)

(52) U.S. Cl.
CPC .......... *B65D 19/0012* (2013.01); *B60P 7/10* (2013.01); *B65D 19/0046* (2013.01); *B65D 2519/00268* (2013.01); *B65D 2519/00333* (2013.01); *B65D 2519/00348* (2013.01)

(58) Field of Classification Search
CPC .......................... B65D 19/00; B65D 19/0012; B65D 19/0046; B65D 2519/00333; B65D 71/0092; B65D 71/0096; B65D 71/0088; B60P 7/10
USPC ..... 206/386; 108/51.11, 137, 44, 55.3, 55.5, 108/57.16, 149, 56.3, 57.21; 248/346.01, 248/346.02
See application file for complete search history.

(56) References Cited

U.S. PATENT DOCUMENTS

| 4,077,532 | A | * | 3/1978 | Bryan | ....................... B60P 1/52 108/55.3 |
| 6,622,640 | B2 | * | 9/2003 | Taylor | ................ B65D 90/0013 108/55.5 |
| 2021/0300652 | A1 | * | 9/2021 | Berman | ............... H05K 1/0295 |

FOREIGN PATENT DOCUMENTS

| CN | 114229175 A | * | 3/2022 |
| JP | H0586826 | | 11/1993 |

* cited by examiner

*Primary Examiner* — Rafael A Ortiz
(74) *Attorney, Agent, or Firm* — JCIPRNET (57) ABSTRACT

A pallet structure includes a positioning mechanism is provided. The positioning mechanism includes an engaging element disposed on a sloping edge and adapted to be engaged with slits formed on the inclined surface of a vehicle. A coil spring is connected between the engaging element and the sloping edge and biasing the engaging element to protrude outward from an outer surface of the sloping edge. A retaining element is disposed between an inner surface of the sloping edge and a bottom deck board of the pallet and configured to retain the engaging element to move between an engaging position and a disengaging position. The protruding end of the engaging element is protruded outward from the outer surface of the sloping edge in the engaging position, and the protruding end of the engaging element is not protruded from the outer surface of the sloping edge in the disengaging position.

7 Claims, 7 Drawing Sheets

PALLET STRUCTURE FOR AUTONOMOUS WORK VEHICLE

BACKGROUND OF THE DISCLOSURE

Technical Field

The disclosure relates to a pallet structure for an autonomous work vehicle, particularly to a pallet structure with positioning elements adapted for an autonomous work vehicle.

Related Art

Autonomous work vehicles (AWV) are mainly used for hauling, towing, transporting and/or shipping materials, water, wood panels, solar energy panels, and other supplies to given destinations. Generally, AWVs are set to be driven to preprogrammed points, and AWVs can also be driven by remote control. In order to perform the duties of hauling, towing, transporting and/or shipping articles from place to place, AWVs are equipped with a compartment for loading the materials/articles, and forklifts that lift or transport the materials/articles are generally used for handling and/or placing the articles between the AWVs and a supporting surface such as a ground floor, a deck surface of a transporting vehicle and the like.

When, by using the forklifts to perform handling and/or placing the articles from place to place, namely handling and/or placing the articles from the loading surface of the compartment of the AWV to the supporting surface on which the articles are to be placed, pallets are usually used as an intermediate loading carriage. A pallet is a portable, horizontal, rigid platform used as a base for assembling, storage, stacking, handling and transporting goods as a unit load. During the handling and/or placing article process, if the unit load (article) is given to be transported from the ground to the loading surface of the compartment of the AWV, the pallet is mounted onto the loading surface of the compartment of the AWV in advance to be used as a base, and then the article is handled and/or placed onto the deck surface of the pallet, for example. Herein, once the pallet is placed onto the loading surface of the compartment of the AWV, an operator (may be a worker or a person other than the driver who is handling the forklift) is needed to check or make sure that the pallet and the AWV are well positioned, and if they are not well positioned then the operator is needed to make them fixed, or the driver who is handling the forklift needs to get off the forklift and fix the positioning of the pallet or the alignment between the pallet and the loading surface of the compartment of the AWV every now and then.

However, considering automation for improving productivity and time and manpower savings, especially for the AWVs since they are the vehicles used in autonomously handling and/or placing articles and performing delivering and supplying articles along a calculated route and proved capable of stopping within preset points, it is inefficient and non-cost effective to prepare manpower for fixing the positioning between the pallet and the loading surface of the compartment of the AWV when placing the pallet onto the loading surface.

The disclose provides a pallet structure for an autonomous work vehicle in which the pallet structure has positioning elements that can be well positioned with the compartment of the vehicle, thereby enabling more efficient in automation and resulting improvement of productivity and time and manpower savings.

SUMMARY

According to an exemplary embodiment of the disclosure, a pallet structure, adapted to be placed on a loading surface of a load compartment of a vehicle is provided. An inclined surface is disposed between the loading surface and a lateral side of the load compartment of the vehicle and a plurality of slits are formed on the inclined surface. The pallet structure includes a top deck board, a bottom deck board, a plurality of stringer elements, a sloping edge and a positioning mechanism. The top deck board is configured to hold a load bearing. The bottom deck board is configured to be supported on the loading surface of the vehicle. The plurality of stringer elements are interlaced between the top deck board and the bottom deck board. The sloping edge is formed between a lateral edge and the bottom deck board. The sloping edge is adapted to be abutted against the inclined surface of the vehicle. The positioning mechanism is connected between the sloping edge and the bottom deck board. The positioning mechanism includes an engaging element, a coil spring and a retaining element. The engaging element is disposed on the sloping edge and adapted to be engaged with one of the plurality of slits formed on the inclined surface. The coil spring is connected between the engaging element and the sloping edge and biasing the engaging element to protrude outward from an outer surface of the sloping edge. The retaining element is disposed between an inner surface of the sloping edge and an upper surface of the bottom deck board and configured to retain the engaging element to move between an engaging position and a disengaging position. The protruding end of the engaging element is protruded outward from the outer surface of the sloping edge in the engaging position, and the protruding end of the engaging element is not protruded from the outer surface of the sloping edge in the disengaging position.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

FIG. 4A to FIG. 4D schematically show different positions of the positioning mechanism of the pallet appeared in different situations in a cross-section view depicted from line A-A shown in FIG. 3.

DESCRIPTION OF THE EMBODIMENTS

In the following drawings and descriptions, in order to make each configuration easy to understand, the scale, the number and the like may be different in each structure and the actual structures. An exemplary embodiment of a pallet structure used for loading articles onto a vehicle by using forklifts is described below with reference to the drawings. The vehicle is implemented as an autonomous work vehicle (AWV).

Figure 1:
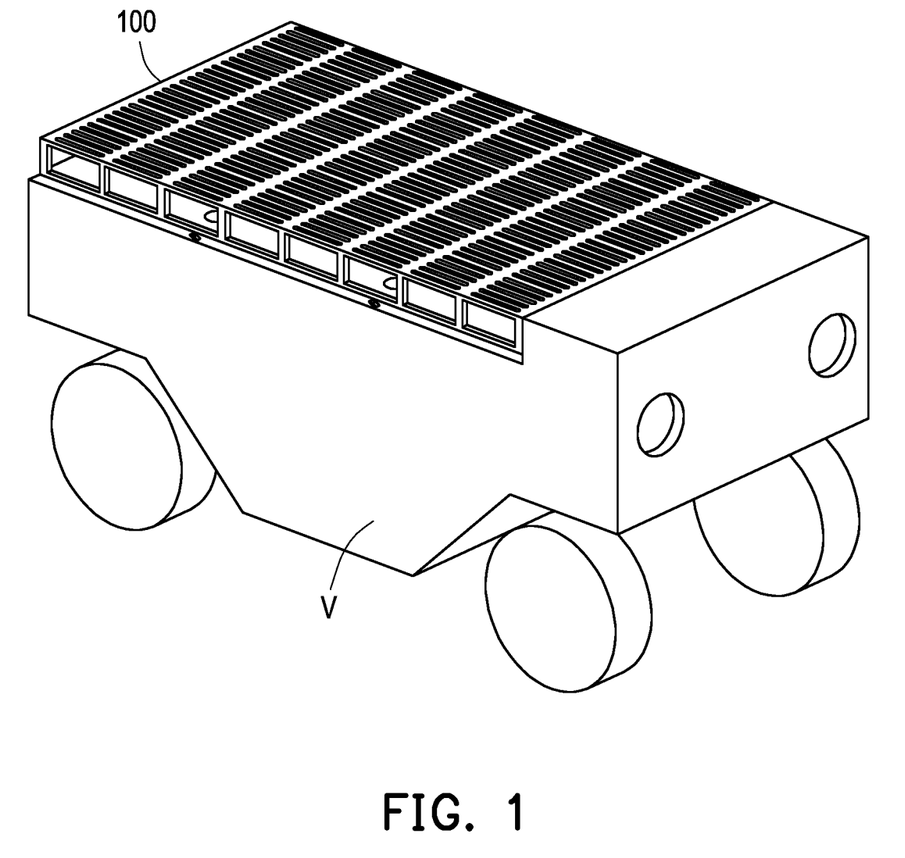
FIG. 1 is a schematic view showing a pallet structure according to an exemplary embodiment of the disclosure is placed on a vehicle.
Figure 2:
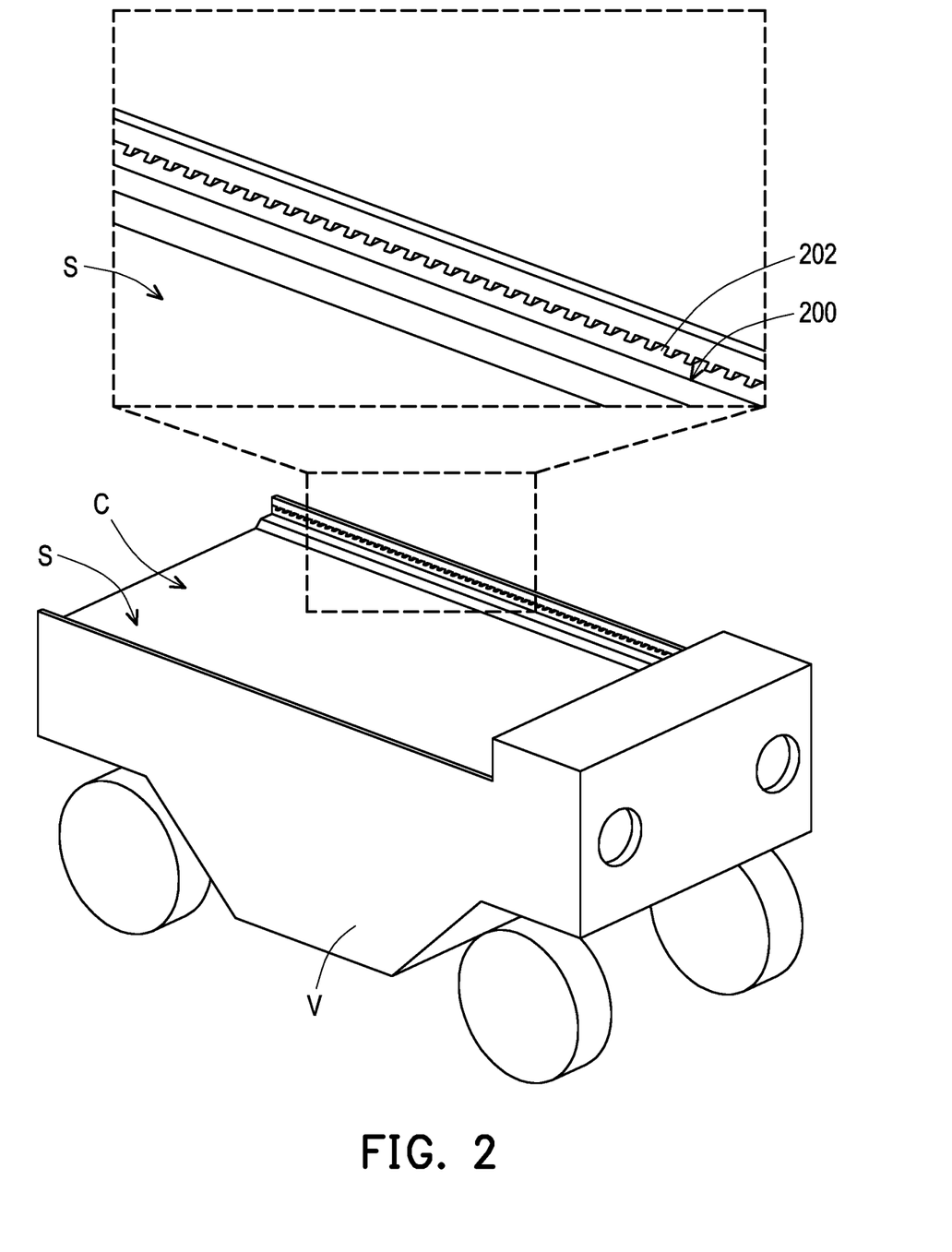
FIG. 2 is a schematic view showing the loading surface of the vehicle in which an inclined surface is disposed.

FIG. 1 is a schematic view showing a pallet structure according to an exemplary embodiment of the disclosure is placed on a vehicle. FIG. 2 is a schematic view showing the loading surface of the vehicle in which an inclined surface is disposed. According to an exemplary embodiment of the disclosure, as shown in FIG. 1 and FIG. 2, the pallet structure (hereinafter called "pallet 100") is adapted to be placed on a loading surface S of a load compartment C of a vehicle V. For example, as shown in FIG. 1, the pallet 100 is placed on the loading surface S of the load compartment C of the vehicle V. Herein, in order to enhance the position of the pallet 100 while being placed onto the loading surface S of the vehicle V, the loading surface S of the vehicle V is disposed an inclined surface 200 at the lateral side (may be at both lateral sides) of the vehicle V, namely the inclined surface 200 is disposed between the loading surface S and the lateral side of the load compartment C of the vehicle V. The inclined surface 200 is adapted to receive a corresponding inclined surface (e.g., the outer surface 110A of the sloping edge 110 of the pallet 100 described in the following paragraphs) in a manner of abutting against each other, in order to enhance the positioning between the pallet 100 and the loading surface S of the vehicle V. The inclined surface 200 may be formed by means of cutting away a portion of material of a block shape material or chamfering an edge of a block shape material and is connected between the lateral side of the load compartment C and the loading surface S. In addition, a plurality of slits 202 are formed on the inclined surface 200. Herein, the slits 202 are used for receiving the positioning mechanism of the pallet to be engaged with. For example, as shown in FIG. 2, the enlarged portion of the inclined surface S shows that the slits 202 may be formed in grid, and the inclined surface S may be formed either on only one lateral side of the load compartment C of the vehicle V, or on both lateral sides of the load compartment C of the vehicle V. In the exemplary embodiment of the disclosure, the slits 202 are formed on both lateral sides of the load compartment C of the vehicle V.

Figure 3:
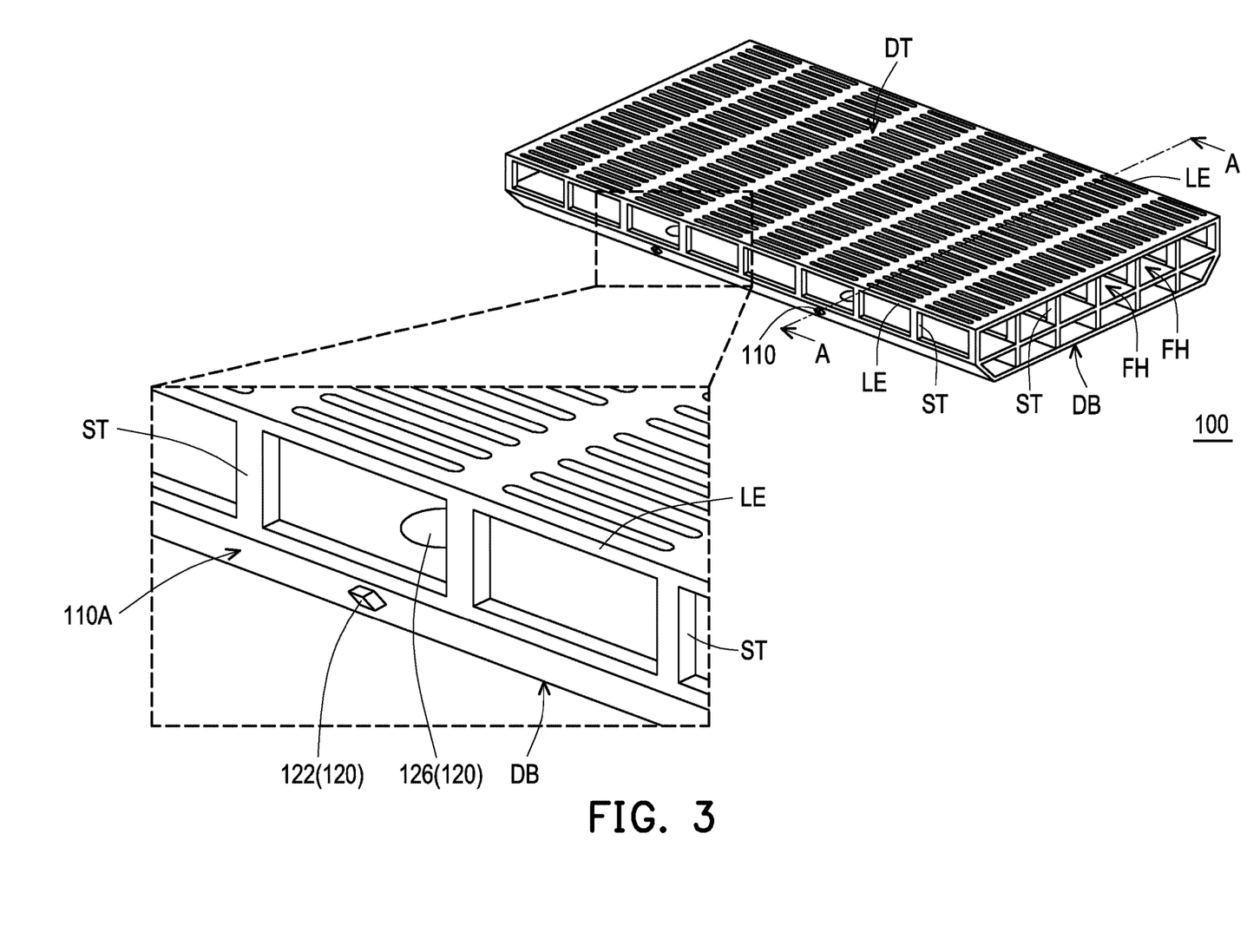
FIG. 3 is a schematic view shows the pallet structure of FIG. 1.

FIG. 3 is a schematic view shows the pallet structure of FIG. 1. The pallet structure 100 includes a top deck board DT, a bottom deck board DB, a plurality of stringer elements ST, a sloping edge 110 and a positioning mechanism 120. The pallet 100 may be formed in a stringer design or in a block design. In the exemplary embodiment of the disclosure, as shown in FIG. 3, the pallet 100 is formed in a stringer design, in which the plurality of stringer elements ST act like supporting pillars and are interlaced between the top deck board DT and the bottom deck board DB. The pallet 100 has openings to accompany forklift, fork truck or hand jack equipment to insert their forks between the top deck board and bottom deck board to lift the pallet and its load off the floor. In the exemplary embodiment, the openings are a plurality of spaces separated by legs (the supporting pillars) of the plurality of stringer elements ST, namely the openings are defined to be a plurality of fork holes FH for receiving the forks of a forklift, a fork truck or a hand jack equipment. The shape of the pallet 100 may be a square or a rectangle with two-way entry or four-way entry into the pallet.

The detailed structure of the positioning mechanism is illustrated as an exemplary embodiment of the disclosure with the drawings (FIG. 4A to FIG. 4D) as follows.

FIG. 4A to FIG. 4D schematically show different positions of the positioning mechanism of the pallet appeared in different situations in a cross-section view depicted from line A-A shown in FIG. 3. As shown in FIG. 4A to FIG. 4D, the pallet 100 includes a top deck board DT, a bottom deck board DB, a plurality of stringer elements ST, a sloping edge 110 and a positioning mechanism 120. The top deck board DT is configured to hold a load bearing. The bottom deck board DB is configured to be supported on the loading surface S of the vehicle V.

In other words, when the pallet 100 is placed on a floor or on the loading surface S of the vehicle V, the bottom surface DBB of the bottom deck board DB is contact with the floor or the loading surface S and the top deck board DT is for loading goods or articles. The plurality of stringer elements ST are interlaced between the top deck board DT and the bottom deck board DB.

As shown in FIG. 4A to FIG. 4D, the sloping edge 110 is formed between a lateral edge LE and the bottom deck board DB. The sloping edge 110 is adapted to be abutted against the inclined surface 200 of the vehicle V when the pallet 100 is placed on the loading surface S of the load compartment C. As such, the configuration of the sloping edge 110 disposed on the pallet 100 and the inclined surface 200 disposed at the lateral side of the load compartment C of the vehicle V makes the positioning between the pallet 100 and the loading surface S of the vehicle V become easier and it is no need to do fine position adjustment operation as in conventional operation.

The positioning mechanism 120 is connected between the sloping edge 110 and the bottom deck board DB. The positioning mechanism 120 includes an engaging element 122, a coil spring 124 and a retaining element 126. The engaging element 122 may be formed by a rod like material and one of the two ends is called a protruding end 122P and the other of the two ends is called a sliding end 122S, hereinafter.

The engaging element 122 is disposed on the sloping edge 110 and adapted to be engaged with one of the plurality of slits S formed on the inclined surface 200. The coil spring 124 is connected between the engaging element 122 and the sloping edge 110 and biasing the engaging element 124 to protrude outward from an outer surface 110A of the sloping edge 110. The retaining element 126 is disposed between an inner surface 110B of the sloping edge 110 and an upper surface DBU of the bottom deck board DB and configured to retain the engaging element 126 to move between an engaging position and a disengaging position.

The protruding end 122P of the engaging element 122 is protruded outward from the outer surface 110A of the sloping edge 110 in the engaging position, and the protruding end 122P of the engaging element 122 is not protruded from the outer surface 110A of the sloping edge 110 in the disengaging position. As shown in FIG. 4A to FIG. 4D, the engaging element 122 is retained by the coil spring 124 disposed on the sloping edge 110 to be protruded (the engaging position) and extracted (the disengaging position) from the outer surface 110A of the sloping edge 110. Thus, the engaging elements 122 may function as claws to be fitted into the slits 202 of the inclined surface S of the vehicle V, thereby the fixing between the two units become more convenient.

The retaining element 126 of the positioning mechanism 120 includes a supporting stand 126 that is used for actuating the protruding and extracting of the engaging element 122. The supporting stand 126S is elastically supported on the upper surface DBU of the bottom deck board DB via a compression spring 128, as shown in FIG. 4A to FIG. 4D. The supporting stand 126 may be formed in a cylindrical pillar shape standing on the upper surface DBU of the bottom deck board DB in side the pallet 100.

Moreover, in order to make the supporting stand 126 may be repeatedly moved up and down in the thickness direction of the pallet 100 (i.e., the up-down direction of the vehicle V when the pallet 100 is placed on the loading surface S of the vehicle V), the compression spring 128 is disposed between the bottom surface of the supporting stand 126 and the upper surface DBU of the bottom deck board DB. An external force is needed to exert on the top of the supporting stand 126 to cause the supporting stand 126 move downward. Herein, the external force may come from the fork that enters inside the pallet 100 for lifting operation.

As shown in FIG. 4A to FIG. 4D, a recess portion R is disposed in the supporting stand 126S for accommodating the sliding end 122S of the engaging element 122 and has a sliding surface RS formed in the recess portion R. As shown in FIG. 4A to FIG. 4D, the sliding end 122S is adapted to move between a top position and a bottom position in the recess portion R as the sliding end 122S slides on the sliding surface RS. The supporting stand 126S has a top cap 126C adapted to be exerted an external force that resists against a restoring force of the compression spring 128 to cause the supporting stand 126 move downward to the upper surface DBU of the bottom deck board DB, and the top cap 126C of the supporting stand 126 has a round and smooth curved surface. The round and smooth curved surface of the top cap 126C of the supporting stand 126 is exposed among the plurality of stringer elements ST and adapted to be pushed by a fork F of a forklift to exert the external force.

The positioning mechanism 120 is configured that the sliding end 122S is located at the bottom position when the protruding end 122P is protruded outward from the outer surface 110A of the sloping edge 110 in the engaging position, and the sliding end 122S is located at the top position when the protruding end 122P is not protruded from the outer surface 110A of the sloping edge 110 in the disengaging position.

When no force is exerted on the top cap 126C of the supporting stand 126, the top cap 126C is located at the uppermost position, i.e., exposed among the corresponding stringer elements ST, the compression spring 128 is not compressed, in which the compression spring 128 is exerted only by a resisting force due to the compressed coil spring 124 that retains the engaging element 122, this resisting force due to the compressed coil spring 124 is not strong enough to cause the compression spring 128 compressed, in which the engaging element 122 is configured that the protruding end 122P protrudes from the outer surface 110A of the sloping edge 110, the sliding end 122S is located at the bottom position at the sliding surface RS and abutted by the sliding surface RS, and the coil spring 124 is compressed.

On the other hand, when an external force is exerted on the top cap 126C of the supporting stand 126, the top cap 126C is located at the lowermost position, i.e., not exposed among the corresponding stringer elements ST, the compression spring 128 is compressed, in which the compression spring 128 is exerted by a resisting force due to the fork F inserting inside the pallet 100, in which the engaging element 122 is configured that the protruding end 122P does not protrude from the outer surface 110A of the sloping edge 110, the sliding end 122S is located at the top position at the sliding surface RS and still retained to be contact with the sliding surface RS, and the coil spring 124 is not compressed. Accordingly, the protruding length of the protruding end 122P protruding from the outer surface 110A of the sloping edge 110 is substantially equal to the displacement of the sliding end 122S in the length direction of the engaging element 122 done by sliding on the sliding surface RS in the recess portion R.

As such, the engaging elements 122 may be randomly inserted and fitted into some of the slits 202, as the slits 202 are formed in grid on the entire inclined surface S, when the pallet 100 is lifted and mounted onto the loading surface S of the load compartment C of the vehicle, it is no need to pay too much attention in doing fine position adjustments. By the engagement between the engaging elements 122 and the slits 202, the pallet 100 and the inclined surface 200 of the loading surface S may be fixed in the front-rear direction and the up-down direction of the vehicle V.

Furthermore, the engaging elements 122 of the pallet 100 are configured to be able to protrude and extract from the sloping edge 110 by means of pushing and pulling by the retaining element 126 that may be pushed from the top inside the pallet 100 by the fork of a forklift. Therefore, it eliminates the need for an operator to fix the positioning of the pallet 100 while mounted onto the loading surface S of the vehicle V, thereby enabling more efficient in automation and resulting improvement of productivity and time and manpower savings.

The restoring force of the compression spring 128 that supports the supporting stand 126 is larger than a restoring force of the coil spring 124 that biases the engaging element 122 to protrude outward from the outer surface 110A of the sloping edge 110. As shown in FIG. 4A to FIG. 4D, the coil spring 124 that elastically retains the engaging element 122 is smaller than the compression spring 128 that elastically retains the supporting stand 126, for example.

The following further describes different positions of the positioning mechanism 120 of the pallet 100 appeared in different situations.

Figure 4A:
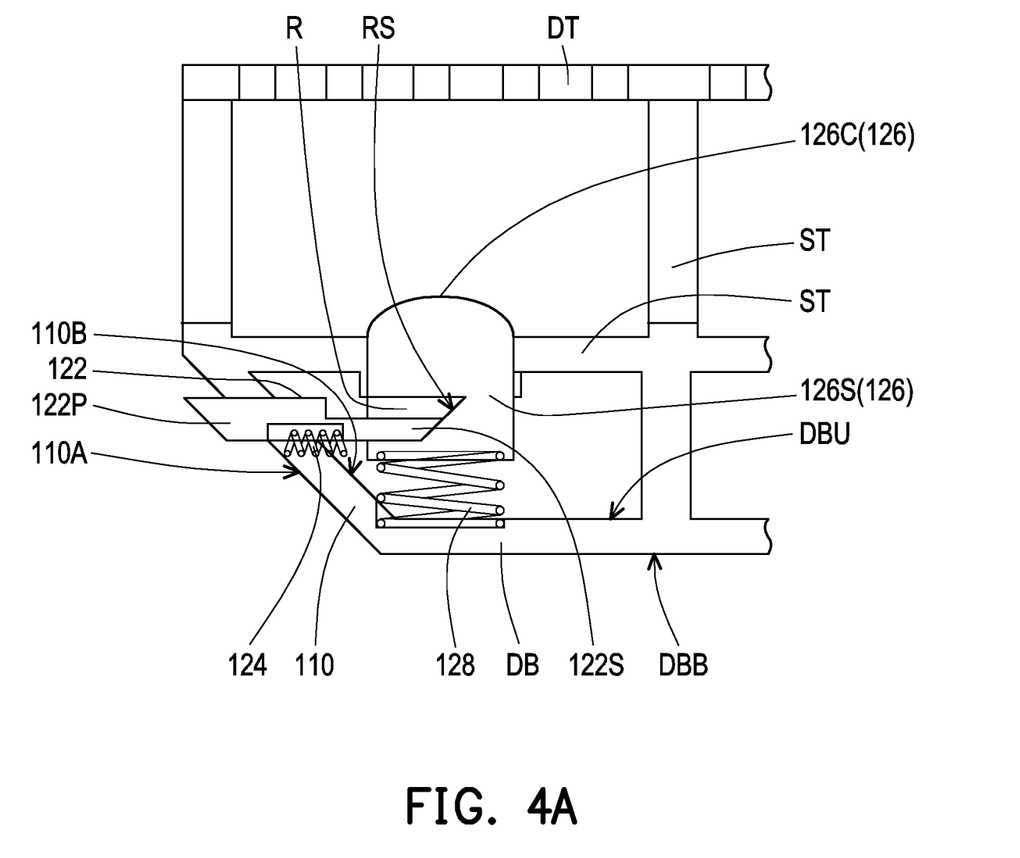

As shown in FIG. 4A, showing that the pallet 100 is placed on the ground and no fork is inserted inside the pallet 100, the engaging element 122 of the positioning mechanism 120 is protruded from the outer surface 110A of the sloping edge 110 and the top cap 126C of the supporting stand 126 is exposed among the corresponding stringer elements ST.

Figure 4B:
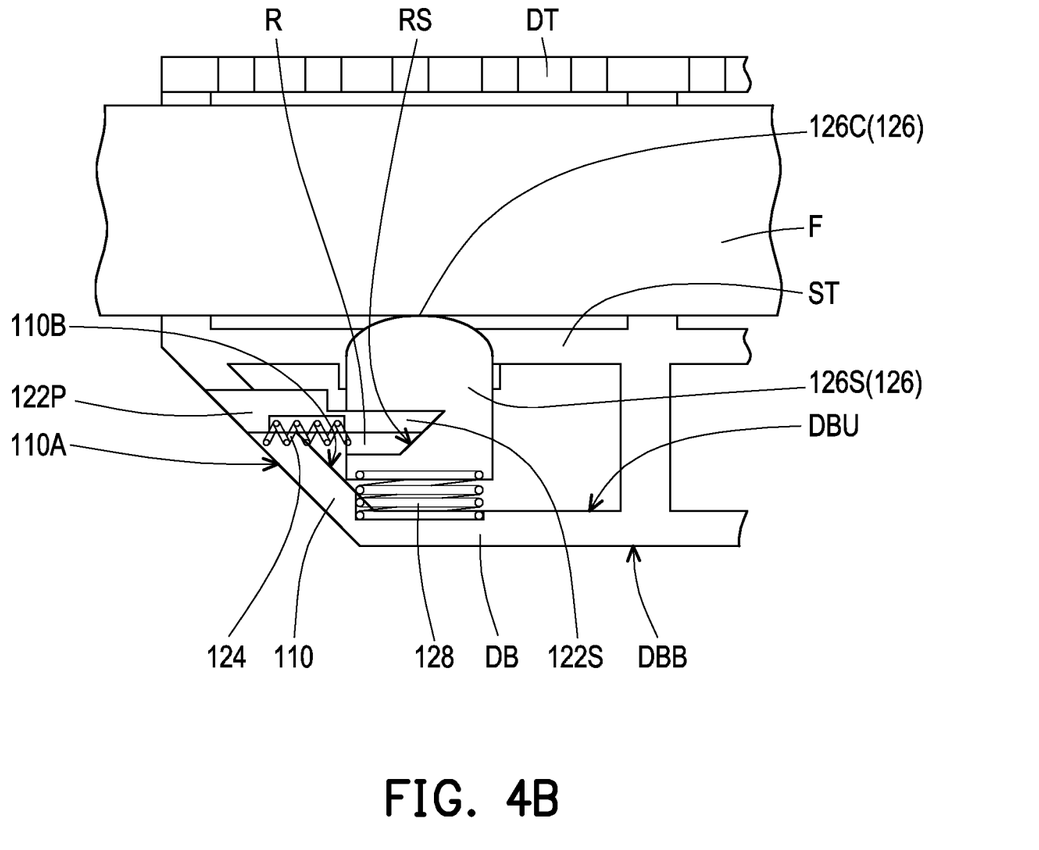

As shown in FIG. 4B, showing that the pallet 100 is placed on the ground and the fork F is inserted inside the pallet 100 and prepares to lift the pallet 100, the engaging element 122 of the positioning mechanism 120 is not protruded from the outer surface 110A of the sloping edge 110 and the top cap 126C of the supporting stand 126 is not exposed among the corresponding stringer elements ST since the supporting stand 126 is pushed by the fork F at the top cap 126C.

Figure 4C:
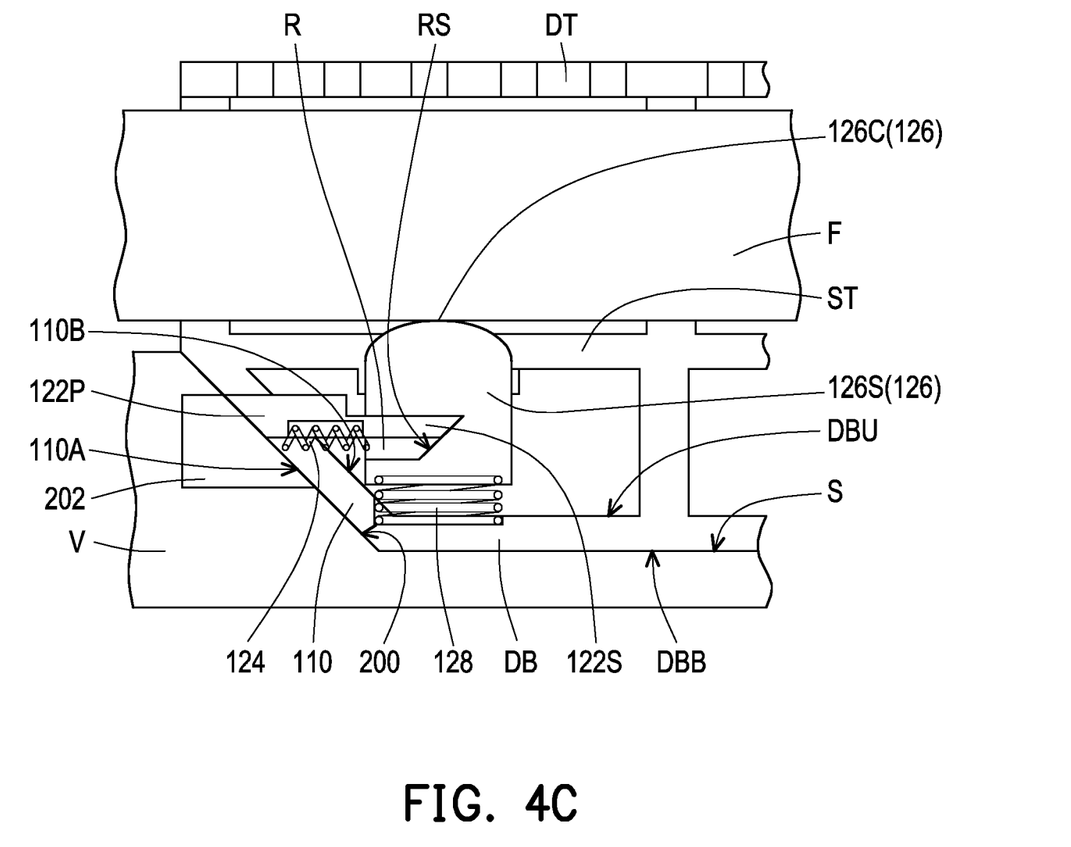

As shown in FIG. 4C, showing that the pallet 100 is placed on the loading surface S of the vehicle V and the fork F is still inserted inside the pallet 100, the engaging element 122 of the positioning mechanism 120 is not protruded from the outer surface 110A of the sloping edge 110 and the top cap 126C of the supporting stand 126 is not exposed among the stringer elements ST since the supporting stand 126 is pushed by the fork F at the top cap 126C, namely the positioning mechanism 120 is in the disengaging position.

Figure 4D:
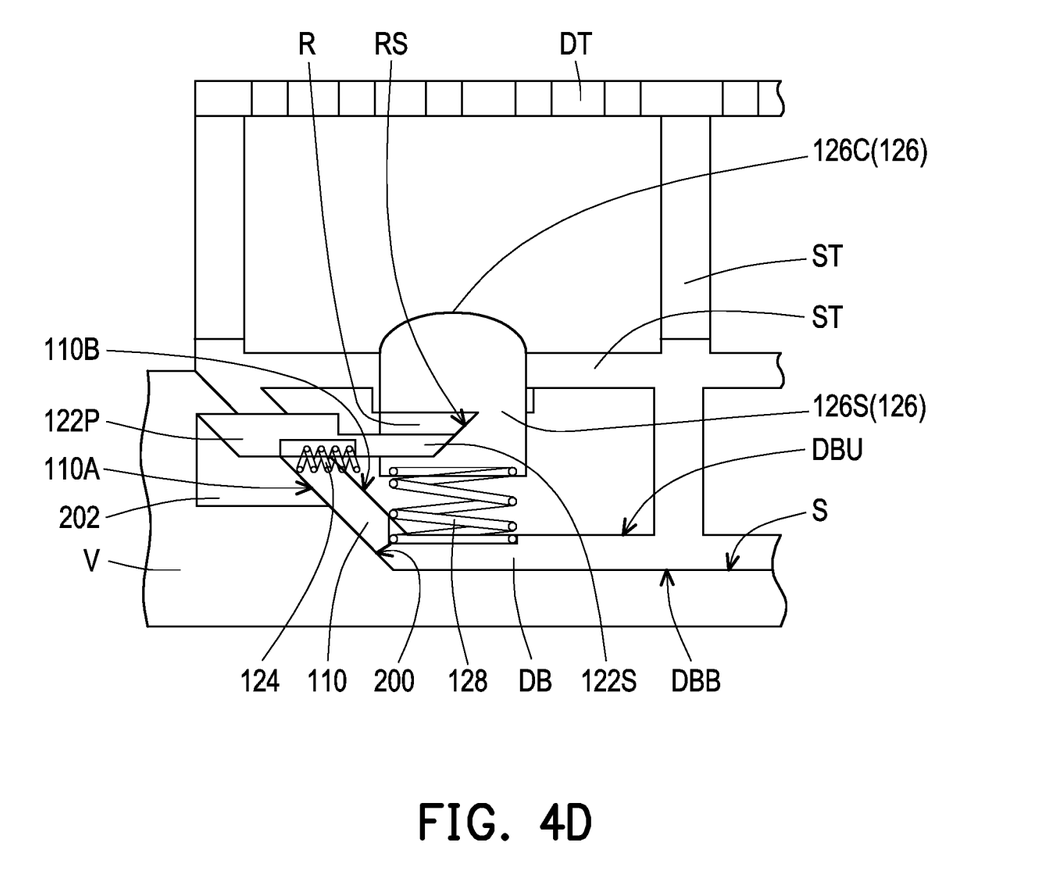

As shown in FIG. 4D, showing that the pallet 100 is placed on the loading surface S of the vehicle V and no fork is inserted inside the pallet 100, the engaging element 122 of the positioning mechanism 120 is protruded from the outer surface 110A of the sloping edge 110 and the top cap 126C of the supporting stand 126 is exposed among the stringer elements ST, namely the positioning mechanism 120 is in the engaging position.

As illustrated in the embodiment of the disclosure, the retaining element of the positioning mechanism further includes a supporting stand elastically supported on the upper surface of the bottom deck board via a compression spring, a recess portion is disposed in the supporting stand for accommodating a sliding end of the engaging element and has a sliding surface formed in the recess portion, the sliding end of the engaging element is an end opposite to the protruding end, the sliding end is adapted to move between a top position and a bottom position in the recess portion as the sliding end slides on the sliding surface, the sliding end is located at the bottom position when the protruding end is protruded outward from the outer surface of the sloping edge in the engaging position, and the sliding end is located at the top position when the protruding end is not protruded from the outer surface of the sloping edge in the disengaging position.

As illustrated in the embodiment of the disclosure, the supporting stand has a top cap adapted to be exerted an external force that resists against a restoring force of the compression spring to cause the supporting stand move downward to the upper surface of the bottom deck board, and the top cap of the supporting stand has a round and smooth curved surface.

As illustrated in the embodiment of the disclosure, the round and smooth curved surface of the top cap of the supporting stand is exposed among the plurality of stringer elements and adapted to be pushed by a fork of a forklift.

As illustrated in the embodiment of the disclosure, a restoring force of the compression spring that supports the supporting stand is larger than a restoring force of the coil spring that biases the engaging element to protrude outward from the outer surface of the sloping edge.

As illustrated in the embodiment of the disclosure, the sloping edge is formed at both lateral edges of the pallet structure, the positioning mechanism comprises a plurality of positioning mechanism, and at least one positioning mechanism is disposed on each sloping edge.

As illustrated in the embodiment of the disclosure, a plurality of spaces separated by legs of the plurality of stringer elements are defined to be a plurality of fork holes for receiving a fork of a forklift.

In light of the foregoing, as illustrated in the embodiment of the disclosure, the configuration of the sloping edge of the pallet and the inclined surface of the vehicle makes the positioning between the two units (the pallet 100 and the loading surface S of the vehicle V) become much easier and it is no need to do fine position adjustment operation as in conventional operation. In addition, the configuration of the engaging elements of the pallet which function as claws and the slits of the vehicle makes the fixing between the two units become more convenient. The engaging elements may be randomly inserted and fitted into some of the slits, as the slits are formed in grid on the entire inclined surface, when the pallet is lifted and mounted onto the loading surface of the vehicle, and it is no need to pay too much attention in doing fine position adjustments. By the engagement between the engaging elements and the slits, the pallet may be well positioned in the front-rear direction and the up-down direction of the vehicle.

Furthermore, the engaging elements of the pallet are configured to be able to protrude and extract from the sloping edge by means of pushing and pulling by the retaining element that may be pushed from the top inside the pallet by the fork of a forklift. Therefore, it eliminates the need for an operator to fix the positioning of the pallet while mounted onto the loading surface of the vehicle, thereby enabling more efficient in automation and resulting improvement of productivity and time and manpower savings.

The embodiment and example of the disclosure are described above; however, the disclosure is not limited to the above-described embodiment and can be variously modified and altered within the scope of the gist of the disclosure. The embodiment and the modifications thereof are included in the scope and the gist of the disclosure and are included in the disclosure described in the claims and equivalent scopes thereof.

INDUSTRIAL APPLICABILITY

The pallet structure according to this disclosure may be advantageously applied in handling and transporting goods with autonomous work vehicles in an automation transportation process.

What is claimed is:

1. A pallet structure, adapted to be placed on a loading surface of a load compartment of a vehicle, wherein an inclined surface is disposed between the loading surface and a lateral side of the load compartment of the vehicle and a plurality of slits are formed on the inclined surface, wherein the pallet structure comprises:
   a top deck board, configured to hold a load bearing;
   a bottom deck board, configured to be supported on the loading surface of the vehicle;
   a plurality of stringer elements, interlaced between the top deck board and the bottom deck board;
   a sloping edge, formed between a lateral edge and the bottom deck board, wherein the sloping edge is adapted to be abutted against the inclined surface of the vehicle; and
   a positioning mechanism, connected between the sloping edge and the bottom deck board,
   wherein the positioning mechanism comprises:
   an engaging element, disposed on the sloping edge and adapted to be engaged with one of the plurality of slits formed on the inclined surface;
   a coil spring, connected between the engaging element and the sloping edge and biasing the engaging element to protrude outward from an outer surface of the sloping edge; and
   a retaining element, disposed between an inner surface of the sloping edge and an upper surface of the bottom deck board and configured to retain the engaging element to move between an engaging position and a disengaging position;
   wherein a protruding end of the engaging element is protruded outward from the outer surface of the sloping edge in the engaging position, and the protruding end of the engaging element is not protruded from the outer surface of the sloping edge in the disengaging position.

2. The pallet structure according to claim 1, wherein the retaining element of the positioning mechanism further comprises a supporting stand elastically supported on the upper surface of the bottom deck board via a compression spring, a recess portion is disposed in the supporting stand for accommodating a sliding end of the engaging element and has a sliding surface formed in the recess portion,
   the sliding end of the engaging element is an end opposite to the protruding end, the sliding end is adapted to move between a top position and a bottom position in the recess portion as the sliding end slides on the sliding surface, the sliding end is located at the bottom position when the protruding end is protruded outward from the outer surface of the sloping edge in the engaging position, and the sliding end is located at the top position when the protruding end is not protruded from the outer surface of the sloping edge in the disengaging position.

3. The pallet structure according to claim 2, wherein the supporting stand has a top cap adapted to be exerted an external force that resists against a restoring force of the compression spring to cause the supporting stand move downward to the upper surface of the bottom deck board, and the top cap of the supporting stand has a round and smooth curved surface.

4. The pallet structure according to claim 3, wherein the round and smooth curved surface of the top cap of the supporting stand is exposed among the plurality of stringer elements and adapted to be pushed by a fork of a forklift.

5. The pallet structure according to claim 2, wherein a restoring force of the compression spring that supports the supporting stand is larger than a restoring force of the coil spring that biases the engaging element to protrude outward from the outer surface of the sloping edge.

6. The pallet structure according to claim 1, wherein the sloping edge is formed at both lateral edges of the pallet structure, the positioning mechanism comprises a plurality of positioning mechanism, and at least one positioning mechanism is disposed on each sloping edge.

7. The pallet structure according to claim 1, wherein a plurality of spaces separated by legs of the plurality of stringer elements are defined to be a plurality of fork holes for receiving a fork of a forklift.

* * * * *